(12) United States Patent
Sawamura

(10) Patent No.: US 8,403,690 B2
(45) Date of Patent: Mar. 26, 2013

(54) WATER STOP STRUCTURE FOR WIRE HARNESS AND METHOD OF FORMING WATER STOP SECTION

(75) Inventor: Naohito Sawamura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 253 days.

(21) Appl. No.: 12/990,231

(22) PCT Filed: Dec. 1, 2008

(86) PCT No.: PCT/JP2008/071822
§ 371 (c)(1),
(2), (4) Date: Oct. 29, 2010

(87) PCT Pub. No.: WO2009/136460
PCT Pub. Date: Nov. 12, 2009

(65) Prior Publication Data
US 2011/0045697 A1    Feb. 24, 2011

(30) Foreign Application Priority Data
May 8, 2008 (JP) .................................. 2008-122795

(51) Int. Cl.
*H01B 7/288* (2006.01)
(52) U.S. Cl. ...................................... 439/203; 174/23 R
(58) Field of Classification Search ................. 439/203, 439/521; 174/76, 23 R, 72 A; 29/857
See application file for complete search history.

(56) References Cited

U.S. PATENT DOCUMENTS

| | | | | |
|---|---|---|---|---|
| 2,815,497 | A * | 12/1957 | Redslob | 439/203 |
| 4,797,513 | A * | 1/1989 | Ono et al. | 174/153 G |
| 5,168,124 | A * | 12/1992 | Takase et al. | 174/23 R |
| 5,362,250 | A * | 11/1994 | McMills et al. | 439/387 |
| 5,532,433 | A * | 7/1996 | Endo et al. | 174/84 C |
| 5,536,904 | A * | 7/1996 | Kojima et al. | 174/23 R |
| 5,560,981 | A * | 10/1996 | Ito | 428/209 |
| 5,888,323 | A * | 3/1999 | Yasukuni et al. | 156/48 |
| 6,257,931 | B1 * | 7/2001 | Sakurai et al. | 439/607.5 |
| 6,303,865 | B1 * | 10/2001 | Yamamoto et al. | 174/72 A |
| 6,517,381 | B2 * | 2/2003 | Kondo | 439/604 |
| 6,624,361 | B2 * | 9/2003 | Suzuki | 174/152 G |
| 6,951,491 | B2 * | 10/2005 | Sakaguchi et al. | 439/879 |
| 7,174,633 | B2 * | 2/2007 | Onuma | 29/854 |
| 7,195,504 | B2 * | 3/2007 | Bertini et al. | 439/201 |

(Continued)

FOREIGN PATENT DOCUMENTS

| | | |
|---|---|---|
| JP | 2000-144099 | 5/2000 |
| JP | 2005-73389 | * 3/2005 |

(Continued)

*Primary Examiner* — Neil Abrams
(74) *Attorney, Agent, or Firm* — Gerald E. Hespos; Michael J. Porco; Matthew T. Hespos

(57) ABSTRACT

A water stop structure is provided for a wire harness connected to an electronic control unit installed in an automotive vehicle or a motorcycle. Terminals mounted on ends of wires constituting the wire harness are inserted and locked for connection in a unit connecting connector to be mated with a connector of the electronic control unit, each wire connected to the unit connecting connector includes a water stop section at a position very close to the connector, and the water stop section is formed by filling a waterproofing agent into clearances between strands of a core exposed part formed by removing an insulation coating covering the core of each wire and coating the core exposed part with a waterproof member.

6 Claims, 6 Drawing Sheets

U.S. PATENT DOCUMENTS

| | | | |
|---|---|---|---|
| 7,238,884 B2 * | 7/2007 | Tanaka et al. | 174/74 R |
| 7,504,584 B2 * | 3/2009 | Ide | 174/92 |
| 7,612,287 B2 * | 11/2009 | Ichikawa et al. | 174/77 R |
| 7,699,654 B2 * | 4/2010 | Tanaka et al. | 439/604 |
| 7,905,755 B1 * | 3/2011 | Martauz | 439/877 |
| 7,952,020 B2 * | 5/2011 | Yamamoto et al. | 174/23 R |
| 7,960,652 B2 * | 6/2011 | Drew et al. | 174/74 R |
| 8,076,572 B2 * | 12/2011 | Sawai | 174/23 R |
| 8,146,248 B2 * | 4/2012 | Nishimura et al. | 29/859 |
| 8,181,343 B2 * | 5/2012 | Martauz et al. | 29/863 |
| 8,304,649 B2 * | 11/2012 | Arai | 174/23 R |
| 2002/0062975 A1 * | 5/2002 | Matsunaga | 174/72 A |
| 2010/0032185 A1 | 2/2010 | Hashimoto et al. | |
| 2010/0212936 A1 * | 8/2010 | Arai | 174/23 R |
| 2011/0045697 A1 * | 2/2011 | Sawamura | 439/587 |
| 2011/0048762 A1 * | 3/2011 | Sawamura | 174/78 |

FOREIGN PATENT DOCUMENTS

| | | |
|---|---|---|
| JP | 2005-73422 * | 3/2005 |
| JP | 2005-80483 | 3/2005 |
| JP | 2007-287647 | 11/2007 |
| JP | 2008-16301 | 1/2008 |
| JP | 2008-186675 | 8/2008 |
| JP | 2008-251345 | 10/2008 |
| WO | 2007/052693 | 5/2007 |
| WO | 2007/088798 | 8/2007 |

* cited by examiner

WATER STOP STRUCTURE FOR WIRE HARNESS AND METHOD OF FORMING WATER STOP SECTION

BACKGROUND OF THE INVENTION

1. Field of the Invention

The present invention relates to a water stop structure and a method of forming a water stop section and is particularly designed to prevent water penetration into an electronic control unit from wires of a wire harness via a connector connecting portion in the wire harness connected a connector of the electronic control circuit.

2. Description of the Related Art

In the case of arranging a wire harness along a water susceptible area in a vehicle such as an automotive vehicle or a motorcycle, a connector connecting portion between the wire harness and an electronic control circuit installed in the vehicle needs to be so designed as to prevent water penetration from wires of the wire harness to the electronic control circuit.

At this time, even if an arrangement path of the wire harness is set in an area not subject to water, water might penetrate to the wires from a water-stop treated portion to the connector connecting portion with the electronic control circuit even if a water stop treatment is applied in an intermediate area of the wire harness in the case where the electronic control circuit is installed in an engine compartment or the like which is a water susceptible area.

Thus, a waterproof connector in which waterproof rubber rings are mounted on respective wires has been conventionally used in a connector connecting portion between an electronic control circuit and a wire harness, whereby water penetration into the electronic control circuit is prevented by a watertight structure of the waterproof connector even if water splashes from outside.

However, if a coated portion of the wire is damaged and a part thereof is peeled off, a crack may reach a conductor of the wire. If this damaged portion is located in a water susceptible area, water reaches the conductor through the damaged portion and penetrates into clearances between strands constituting the conductor. The water having penetrated might possibly penetrate into the electronic control circuit via a terminal crimping portion of the connector through the clearances between the strands by a capillary phenomenon.

Even if a connector connected with an electronic control circuit is a waterproof connector, wires of a wire harness connected with the waterproof connector may have other ends thereof connected to other wires via a non-waterproof connector. In this case, if a connecting portion by the non-waterproof proof connector is subject to water, water might possibly penetrate to conductors of the wires exposed in the non-waterproof connector and further enter clearances between strands of the conductors and reach a connecting portion with the electronic control circuit by the capillary phenomenon similar to the above. Therefore, the wires connected to the electronic control circuit need to have the other ends thereof also connected with the other wires using a waterproof connector.

However, since the waterproof connector is larger as compared with the non-waterproof connector, a larger installation space has to be ensured, which makes it difficult to ensure a wire harness arrangement path in many cases. In addition, the waterproof connector has a higher cost as compared with the non-waterproof connector.

As a connector designed to be waterproof without using the above waterproof rubber rings, the present applicant proposed a waterproof connector, in which a waterproof member made of a material mainly containing a silicone gel is provided and mounted on a terminal insertion side surface of a connector 101, a spacer 102 is arranged on an outer surface of the waterproof member 100 and held onto the connector 101 by a holder 103 as shown in FIG. 9, in Japanese Unexamined Patent Publication No. 2000-144099.

In this waterproof connector, the waterproof member 100 is formed with terminal holes, through which terminals 104 crimped and connected to wire ends are passed through.

The above waterproof connector requires the waterproof member, the spacer and the holder, leading to an increase in the number of parts, a larger size and a cost increase of the connector. In addition, if water reaches the terminal fittings passed through the terminal holes of the waterproof member via conductors of wires by the capillary phenomenon as described above, water penetration to an electronic control unit might not be reliably prevented.

The present invention was developed in view of the above problems and an object thereof is to prevent water penetration without using a waterproof connector as a connector of an electronic control circuit to prevent water penetration to a connector connecting portion with the electronic control circuit, which is installed in a water-free area and no water splashes thereon, from wires of a wire harness connected with a connector.

SUMMARY OF THE INVENTION

In order to solve the above problem, the present invention is directed to a water stop structure for a wire harness for preventing water penetration from the wire harness connected to an electronic unit via a non-waterproof connector, characterized in that: terminals mounted on ends of wires constituting a wire harness are inserted and locked for connection in a non-waterproof connector to be mated with the non-waterproof connector of the electronic control unit, each wire connected to the connector includes a water stop section at a very close position in a range of 10 to 100 mm from a terminal insertion surface, and the water stop section is formed by filling a waterproofing agent into clearances between strands of a core exposed part formed by exposing a core of each wire from an insulation coating part and coating the core exposed part with a waterproof member.

As described above, in the present invention, the water stop section is provided by applying a water stop treatment to the core of the wire at the position closest possible to the connector at a side of the wires connected to the connector of the electronic control unit. Since the water stop section is formed by filling the waterproofing agent into clearances between the strands of the core exposed part and coating the core exposed part with the waterproof sheet, water between strands can be blocked by the water stop section even if water penetrates between the strands due to a damage of an insulation coating. Therefore, even if the connector connected with the electronic control unit is a non-waterproof connector, water penetration into the electronic control unit from the wire side can be prevented.

Note that the electronic control unit connector-connected to the wire harness is installed in a water-free area and the connector connecting the wire harness and the electronic control unit is located in an area not subject to water.

In the wire harness formed by bundling a plurality of wires connected to the connector, the wires need to be loosened at a connector connected side in order to insert and lock the terminals at the ends of the wires in terminal accommodating chambers of the connector. If a water stop section coated with a waterproof sheet is provided at this wire loosened position, intervals between the terminal accommodating chambers of the connector become larger than those between the wires due to an increase in a wire diameter and it becomes more difficult to insert the terminals into the terminal accommodating chambers.

Thus, it is optimal to provide the water stop section of each wire at a position, adjacent to the loosened position, where a group of the wires is bundled, i.e. at a leading end side of a bundled part.

An optimal position of the water stop section is located in a range of 10 to 100 mm from a terminal insertion surface of the connector.

For example, a wire bundled position is about 10 mm from the terminal insertion surface if there are two wires while being about 100 mm therefrom in the case of a multipolar connector with 30 or more poles.

If the water stop section is provided at the leading end side of the wire bundled part in this way, the terminals at the ends of the respective wires can be smoothly inserted and locked in the terminal accommodating chambers of the connector. In addition, since no external interfering member is present in the range of about 10 mm to 100 mm very close to the connector, there is no likelihood of damaging the insulation coatings of the wires and a water stop treatment is applied at this position, whereby water having penetrated to the cores can be reliably blocked to prevent water penetration into the electronic control unit.

In a second invention, a crimping terminal is swaged and crimped to the core exposed part, and the waterproofing agent is filled in the core exposed part between the crimping terminal and the insulation coating.

If not only the waterproofing agent is dropped to the core exposed part, but also the crimping terminal is swaged and crimped to the core in this way, clearances between the strands can be eliminated. Thus, by applying the water stop treatment in two steps by swaging and crimping by the crimping terminal and filling of the waterproofing agent, water penetrating through the clearances between the strands can be more reliably blocked.

The waterproof member for coating the core exposed part filled with the waterproofing agent may be a waterproof cover which coats the core exposed part by being wound around the core exposed part, or a heat shrinkable tube which includes an inner layer of an adhesive and coats the core exposed part by being mounted thereon and heated to be shrunk.

The electronic control unit is one or more selected from an engine control unit, an engine fuel control unit, an ABS control unit, an airbag control unit, a running safety control unit, a vehicle radar control unit and a night-vision camera control unit.

Devices connected to the electronic control unit via the wire harness are one or more controllable devices selected from a light, a washer, a door lock, an anti-theft horn and a starter which are controlled by the electronic control unit, sensors such as an $O_2$ sensor, a speed sensor, a knock sensor and a collision sensor, which are adapted to transmit information to the electronic control unit, and/or another electronic control unit, and one or more electrical components selected from a fuse, a relay, a connector and a ground member of an electrical connection box.

Since the above electronic control unit relates to a running safety system of the automotive vehicle, it needs to be prevented that water penetrates from the connector connecting portion with the wire harness to cause a malfunction in the control of the electronic control unit. Thus, reliability in running safety can be improved by providing the water stop section at the wire side immediately before the connector connecting portion and reliably preventing water penetration to the electronic control unit.

It is sufficient to use fluid resin as the waterproofing agent, but silicone resin is most preferably used.

Instead of the silicone resin, silicone rubber, grease or viscous and elastic adhesive may be suitably used. Silicone resins come in a two-liquid mixing type and a one-liquid type. Either type may be used provided that it has fluidity for a required time. The one-liquid type having a slower curing time is more preferable. Also in view of the operation of dropping the silicone resin, the one-liquid type is more preferably used.

The present invention also provides a method of forming the water stop section of the wire harness.

A waterproofing agent is dropped to the core exposed part where the core is exposed form the insulation coating, and pressure air is introduced after the dropping of the waterproofing agent so that the dropped waterproofing agent penetrates into clearances between strands of the core exposed part and into clearances between strands inside parts of the insulation coating at the opposite sides of the core exposed part, and the core exposed part is then coated by having an adhesive waterproof sheet wound therearound.

In the method of forming the water stop section according to the present invention, after the core is exposed from the insulation coating at a position close to a terminal crimping portion for connector connection, the waterproofing agent is dropped and, then, the wire is set in a pressurized container, into which pressure air is supplied. By loading the part of the wire, to which the waterproofing agent was dropped, with pressure air in this way, the waterproofing agent can be reliably pressed into the clearances between the strands of the core exposed part. In addition, the waterproofing agent can be pressed into the clearances between the strands of the core inside the parts of the insulation coating at the opposite sides of the core exposed part and into the clearances between the parts of the inner surface of the insulation coating and the strands. Therefore, the water stop section of the wire can be relatively easily formed immediately before the connector connecting portion with the electronic control unit.

As described above, the water stop section is provided by applying the water stop treatment to the core of the wire at the position closest possible to the connector in the wire harness having the end thereof connected with the connector connected with the electronic control unit. Thus, if water penetrates into the clearances between the stands due to a damage of the insulation coating at a position of the wire side distant from the water stop section, water can be blocked immediately before the connector connecting portion. Therefore, even if the connector connected to the electronic control unit is a non-waterproof connector, water penetration from the wire side to the electronic control unit can be prevented.

DETAILED DESCRIPTION OF THE PREFERRED EMBODIMENTS

Hereinafter, embodiments of the present invention are described in detail with reference to the drawings.

FIGS. 1 to 6 show a first embodiment.

Figure 1:
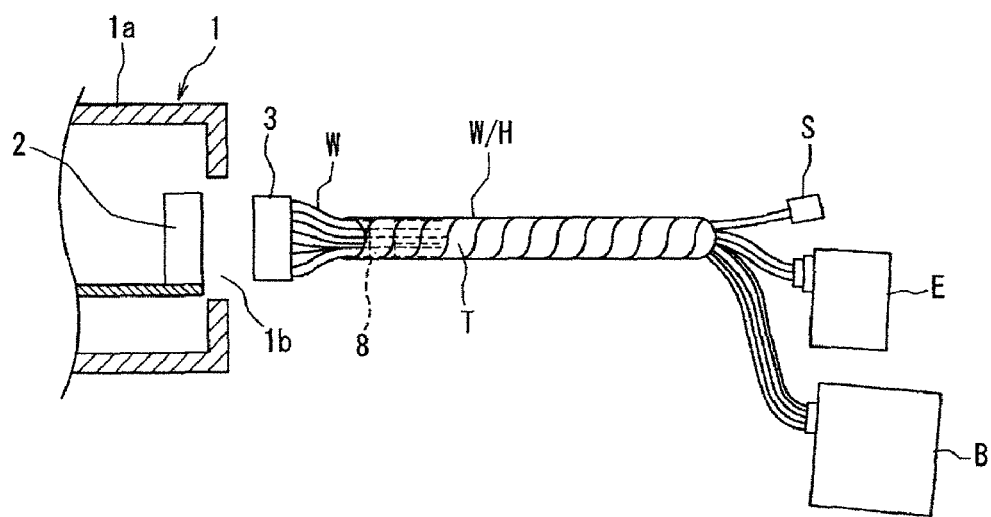
FIG. 1 is an overall construction diagram showing one embodiment of the invention.
Figure 2:
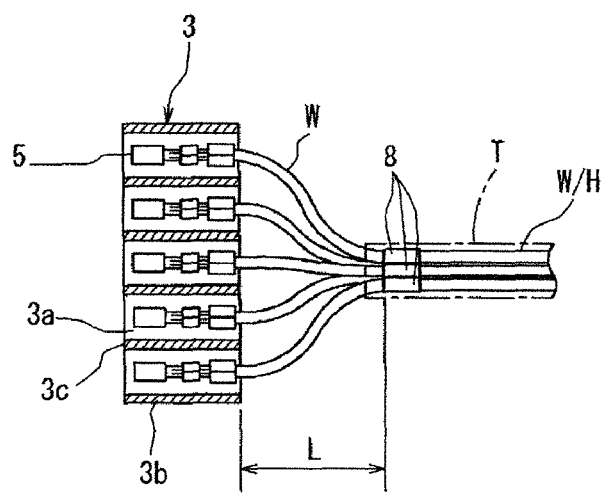
FIG. 2 is a partial enlarged plan view in section showing a connector connected side of a wire harness.

As shown in FIG. 1, a connector 3 is connected to a leading end of a wire harness W/H of this embodiment. This connector 3 is mated with a connector 2 mounted on a circuit board of an electronic control unit 1 (hereinafter, called "ECU") installed in an engine compartment of an automotive vehicle and is a unit connecting connector.

The electronic control unit 1 is installed in a water-free area not subject to water. Hence, a connecting portion between the connector 2 of the electronic control unit 1 and the connector 3 at the end of the wire harness is not subject to water.

The ECU 1 of this embodiment is an engine fuel control unit. Wires of the wire harness W/H connector-connected to the ECU 1 are connected to sensors S such as an $O_2$ sensor, a speed sensor, a knock sensor and a collision sensor, another electronic control unit E and a fuse, a relay and a connector of an electrical connection box B.

A plurality of wires W are bundled by winding a tape T to form the wire harness W/H and, in a connecting portion with the connector 3 at the leading end, a group of wires are loosened and spread in a fan-like manner without being taped to insert and lock male terminals 5 connected to ends of the respective wires W in respective terminal accommodating chambers 3a of the connector 3.

Figure 3:
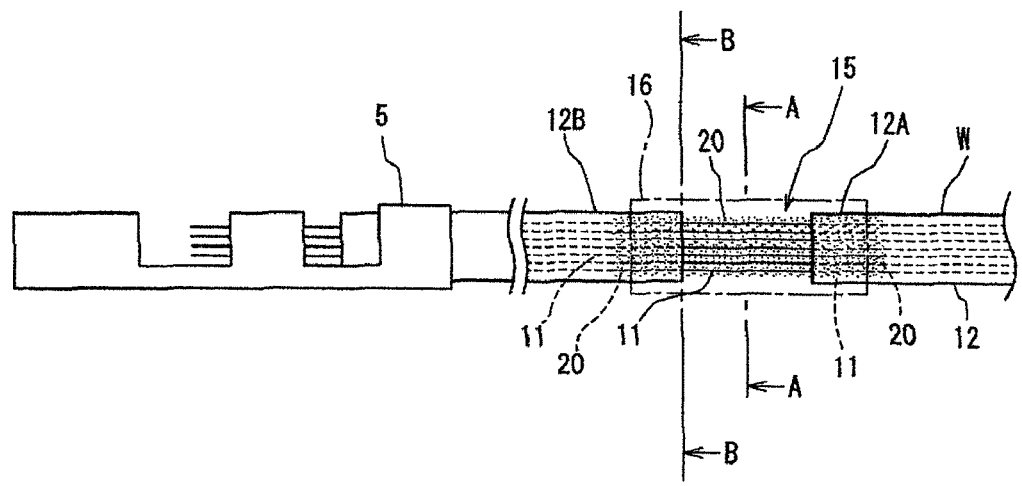
FIG. 3 is a diagram showing a water stop section of a wire constituting the wire harness.
Figure 4A:
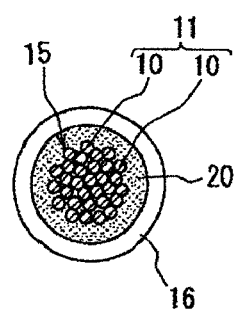
FIG. 4(A) is a section along A-A of FIG. 3
Figure 4B:
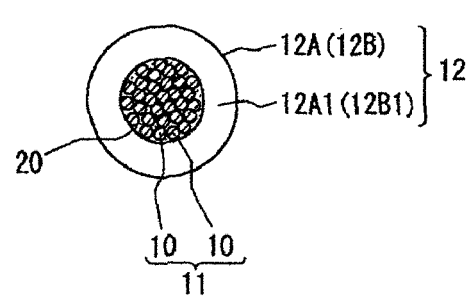
FIG. 4(B) is a section along B-B of FIG. 3.

Each wire W is a round wire in which a core 11 formed by twisting a multitude of strands 10 is covered by an insulation coating 12 as shown in FIGS. 3 and 4.

The male terminals 5 to be inserted and locked in the connector 3 are crimped and connected to ends of the respective wires W constituting the wire harness W/H, and a water stop section 8 is provided at a position at a distance L of 10 to 100 mm from an insertion side end surface of the connector 3 (position at a distance of 20 to 100 mm from a terminal crimped position). Note that the distance L is 50 mm in this embodiment.

The water stop section 8 is provided at such a position as to be covered by a leading end side of the tape T wound around the wire group, i.e. at a connector base position of the wires W drawn out from the leading end of the wound part by the tape T and loosened and spread in a fan-like manner.

The water stop section 8 of each wire W is formed as follows. A slit is formed in the insulation coating 12 over the entire circumference, and a part of the insulation coating at one side of the slit is pulled and moved toward one side (so-called coating pulling) to expose the core 11. A waterproofing agent 20 containing liquid silicone resin having a required viscosity is filled into this core exposed part 15, and a waterproof sheet 16 having an adhesive applied thereto is wound around and fixed to the core exposed part 15.

The waterproofing agent 20 is so filled as to penetrate into clearances between the strands 10 of the core exposed part 15. In addition, the waterproofing agent 20 is caused to penetrate into the insides of insulating resin layers 12A, 12B at the opposite ends of the core exposed part 15 from end surfaces 12A1, 12B1, thereby being also filled in clearances between the strands 10 of the core inside the insulation coatings 12A, 12B.

The water stop section 8 of the wires W formed by winding the waterproof sheet 16 around these outer circumferential surfaces is covered by the tape T as a bundling member as described above.

The connector 3 connected to the leading end of the wire harness W/H and the connector 2 of the ECU 1 to be mated with the connector 3 are non-waterproof connectors which are not waterproof.

The connector 3 is formed with the terminal accommodating chambers 3a by providing partition walls 3c in a connector housing 3b. The terminals 5 connected to the ends of the respective wires W of the wire harness W/H are inserted and locked in these terminal accommodating chambers 3a. A locking lance (not shown) for locking the terminal is formed at a bottom wall surrounding each terminal accommodating chamber 3a and engaged with a locking groove of the terminal 5.

The connector 2 of the ECU 1 is located in a housing 1a while facing a connector insertion opening 1b formed in the housing 1a of the ECU. The connector 3 of the wire harness W/H is inserted into the ECU 1 through the connector insertion opening 1b, thereby mating the connectors 3 and 2.

Next, a method of forming the water stop section 8 of the wire W is described with reference to FIGS. 5 and 6.

Figure 5:
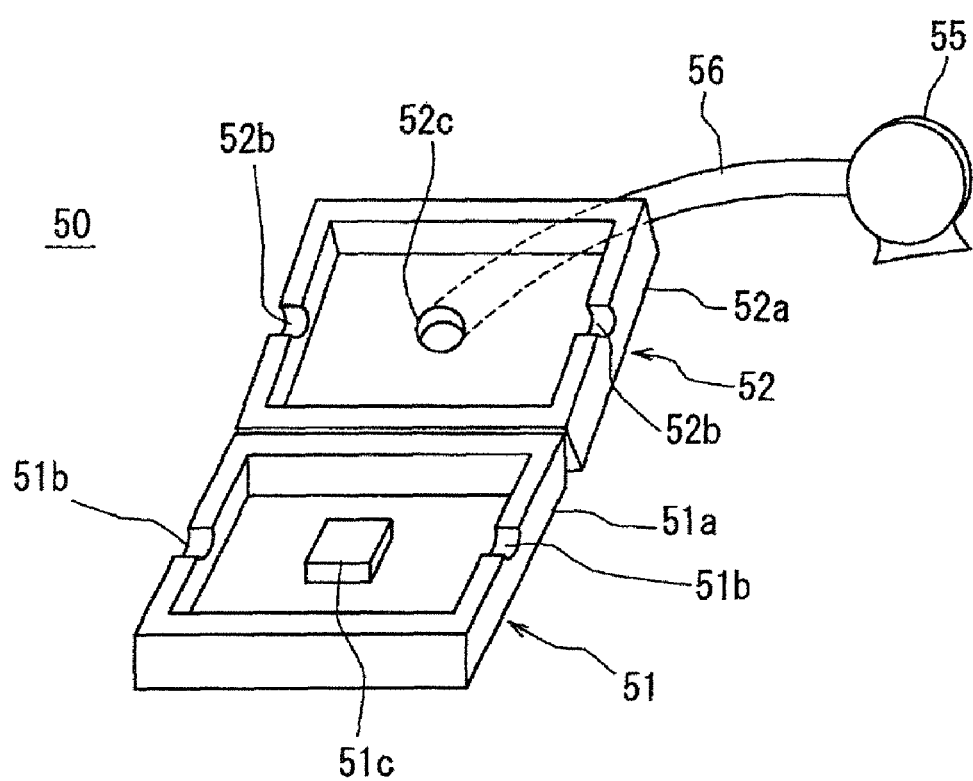
FIG. 5 is a perspective view of a pressurized container used to form the water stop section.

As shown in FIG. 5, a pressurized container 50 is provided to seal the core exposed part 15 and the insulating resin layers 12A, 12B at the opposite sides. The pressurized container 50 includes a lower container 51 and an upper container 52 hinged to each other. Semicircular groove portions 51b, 52b, through which one wire W is inserted while being closely fitted, are formed in central parts of joint surfaces of the opposite side walls 51a, 51b where the upper and lower containers 51, 52 are joined when the upper container 52 is rotated with respect to the lower container 51 to be closed.

The lower container 51 is shallow and a step-shaped projection 51c is provided in a central part of its bottom wall.

On the other hand, a pipe mount hole 52c is formed in an upper wall of the upper container 52, and the leading end of a pressure air introducing pipe 56 connected to a compressor 55 is coupled to the pipe mount hole 52c.

The method of forming the water stop section 8 using the pressurized container 50 is composed of processes shown in FIGS. 6(A) to 6(D).

Figure 6A:
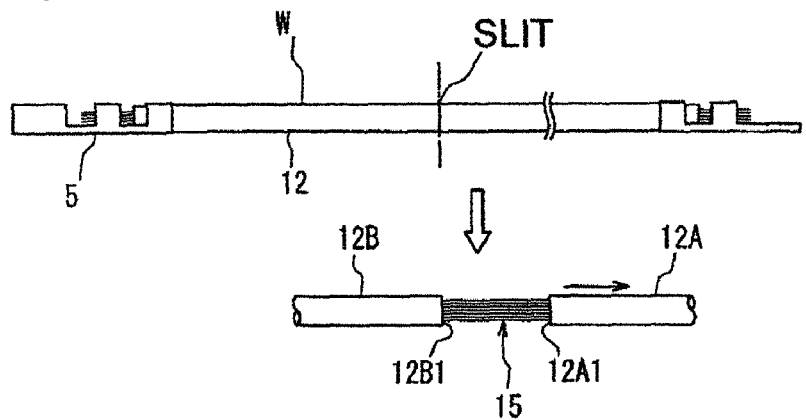
FIGS. 6(A) to 6(D) are diagrams showing a process of forming the water stop section of the wire using the pressurized container.

At a wire side of the wire harness W/H, as shown in FIG. 6(A), a slit is first formed in each wire W in a circumferential direction of the insulation coating 12 at a position at a distance of 20 to 100 mm from the leading end of the wire W to which the terminal 5 is crimped and connected, the insulating resin part 12A at a terminal non-connected side of the slit is moved to form the core exposed part 15 having the insulation coating removed between the insulating resin part 12A and the insulating resin part 12B at the opposite side.

Figure 6B:
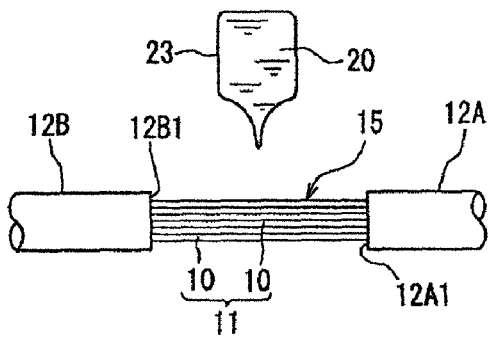

Subsequently, as shown in FIG. 6(B), the core exposed part 15 is located below a dispenser 23 for the waterproofing agent 20.

Figure 6C:
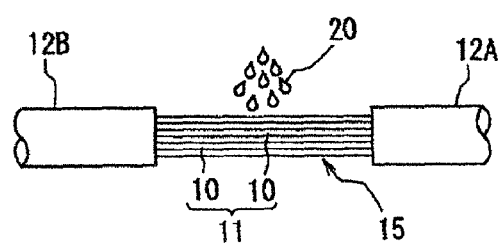

Subsequently, as shown in FIG. 6(C), the waterproofing agent 20 containing fluid silicon resin having a required viscosity (e.g. 0.6 Pa·s) is dropped to the core exposed part 15 from above.

Immediately after the waterproofing agent 20 is dropped, the core exposed part 15 of the wire 10 is located in the central part of the lower container 51, the insulation coatings 12A, 12B at the opposite sides are placed in the semispherical groove portions 51b in the opposite side walls of the lower container 51, and the core exposed part 15 is set on the step-shaped projection 51c with the upper container 52 of the pressurized container 50 fully opened.

Note that the core exposed part 15 may be set in the pressurized container 50 and the waterproofing agent 20 may be dropped to the wire W with the upper container 52 opened.

Figure 6D:
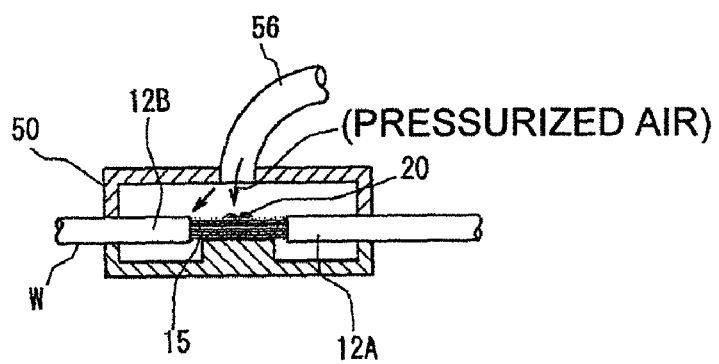

As shown in FIG. 6(D), the upper container 52 is rotated to close the lower container 51 after the wire W is set in the lower container 51. In this state, the semispherical groove portions 52b of the upper container 52 are fitted to the upper halves of the circumferential surfaces of the insulation coatings 12A, 12B. In this way, the core exposed part 15 and the insulation coatings 12A, 12B at its opposite sides are accommodated in a sealed manner in the upper and lower containers 52, 51.

Subsequently, pressure air of 50 to 300 kg/cm$^2$ is introduced into the interior of the pressurized container 50 via the pressure air introducing pipe 56 by the compressor 55.

By the introduced pressure air, the waterproofing agent 20 dropped to the core exposed part 15 is pressed into the clearances between the strands and also into the clearances between the strands 10 inside the insulation coatings 12A, 12B at the opposite sides of the core exposed part 15. Since the outer circumferential surfaces of the insulation coatings 12A, 12B are also loaded with pressure during this time, a small amount of the waterproofing agent 20 is pressed into the insides of the insulation coatings 12A, 12B, the flow of the waterproofing agent 20 inside the insulation coatings 12A, 12B can be hindered and the waterproofing agent 20 can be reliably pressed into the clearances between the strands 11 of the core exposed part 15.

Thereafter, the wire W is taken out of the pressurized container 50, and the waterproof sheet 16 is wound to form the water stop section 8 before or after the waterproofing agent 20 filled in the clearances between the strands 11 and the waterproofing agent 20 on the outer circumferential surfaces of the strands 11 of the core exposed part 15 are cured.

In this way, a part including the core exposed part 15 may be set in the pressurized container and loaded with pressure air. Thus, it is sufficient to treat only the part including the core exposed part 15 and an apparatus can be made smaller in size.

Instead of the above method, negative pressure may be introduced to the inside of the insulation coating 12 from the other end of each wire W, so that the waterproofing agent 20 is sucked into the clearances between the strands 11 of the core exposed part 15 and the inside of the insulation coating part 12.

As described above, in the present invention, the water stop section 8 is provided in each wire W at the position very close to the unit connecting connector 3 connected to the ECU 1 in the wire harness W/H connected to the ECU 1. Thus, even if the insulation coating 12 of the wire W is damaged at a position distant from the water stop section 8 or water intrudes into the connector at the other end of the wire W and water penetrates to the side connected to the connector 3 through the clearances between the strands 11 of the core 11 inside the insulation coating 12 by a capillary phenomenon, water can be reliably blocked at the water stop section 8 since the waterproofing agent 20 is filled in the clearances between the strands 10 in the water stop section 8. Therefore, water penetration into the interior of the ECU 1 from the wires W through the connecting portion of the connector 3 and the connector 2 of the ECU 1 can be prevented.

Figure 7A:
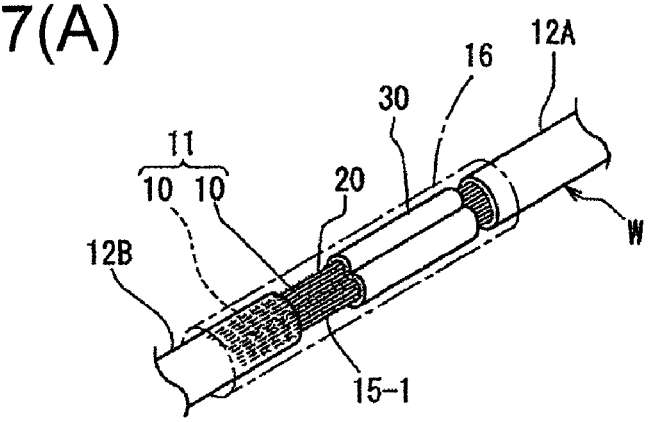
FIG. 7(A) is a diagram showing a water stop section according to a second embodiment.
Figure 7B:
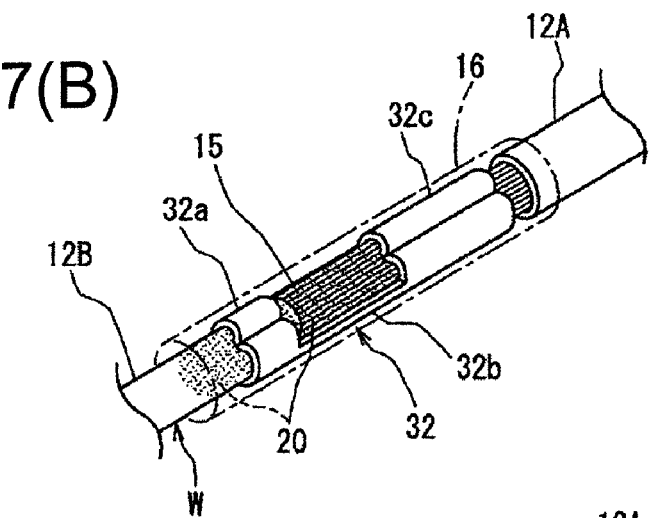
FIG. 7(B) is a diagram showing a water stop section according to a first modification of the second embodiment.
Figure 7C:
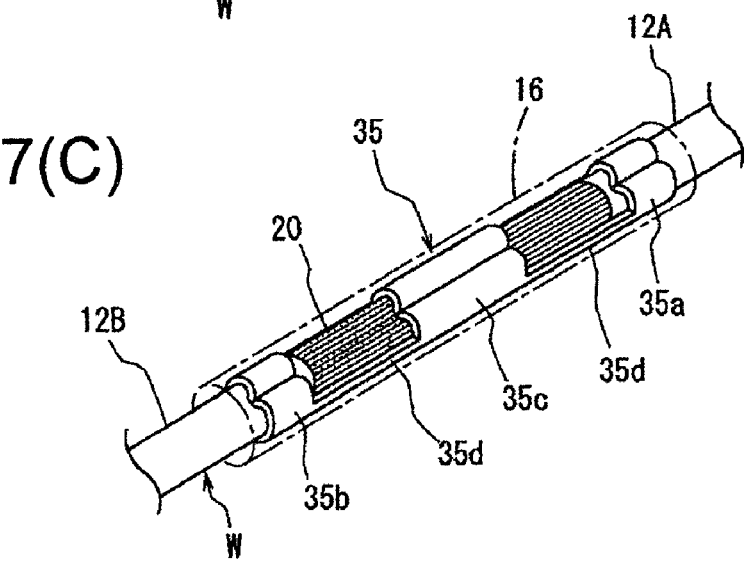
FIG. 7(C) is a diagram showing a second modification of the second embodiment.

FIG. 7(A) shows a second embodiment, and FIGS. 7(B) and 7(C) show modifications of the second embodiment.

Although what is performed is only to drop the waterproofing agent 20 to the core exposed part 15 in the first embodiment, an intermediate crimping terminal 30 is swaged and crimped to the core exposed part 15 to eliminate the clearances between the strands 10 and, similar to the first embodiment, the waterproofing agent 20 is dropped and filled in the clearances between the strands 10 in the second embodiment.

Specifically, the intermediate crimping terminal 30 is swaged and crimped to the core exposed part 15 and the waterproofing agent 20 is filled in a core exposed part 15-1 between the intermediate crimping terminal 30 and the insulation coating 12B at a side where a connector connecting terminal is connected (at a leading end side). Thereafter, the waterproof sheet 16 is wound as shown.

In a first modification of the second embodiment shown in FIG. 7(B), there is used a crimping terminal 32 in which a barrel portion 32a to be crimped and connected to the insulation coating 12B is connected to an intermediate barrel portion 32c via a base plate portion 32b. The other construction is same as in a second modification.

In the second modification shown in FIG. 7(C), there is used a crimping terminal 35 in which barrel portions 35a, 35b to be swaged and crimped to the insulation coatings 12A, 12B at the opposite sides of the core exposed part 15 and an intermediate barrel portion 35c to be swaged and crimped to the core of the core exposed part 15 are connected via a base plate portion 35d. The other construction is same as in the first modification.

If not only the waterproofing agent 20 is dropped to the core exposed part 15, but also the crimping terminal is swaged and crimped to the core 11 as in the second embodiment, the clearances between the strands can be eliminated also at the swaged position of the crimping terminal. By eliminating the clearances between the strands 10 by swaging and crimping the crimping terminal in this way and eliminating the clearances between the strands 10 by filling the waterproofing agent 20 to apply a water stop treatment in two steps in this way, water penetrating through the clearances between the strands can be more reliably blocked.

Figure 8:
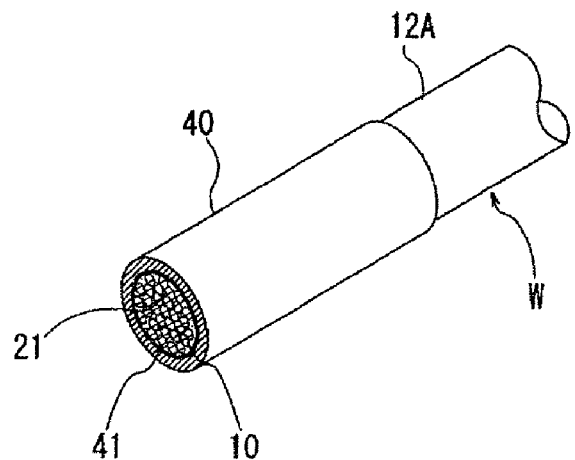
FIG. 8 is a perspective view showing an essential part of a third embodiment.
Figure 9:
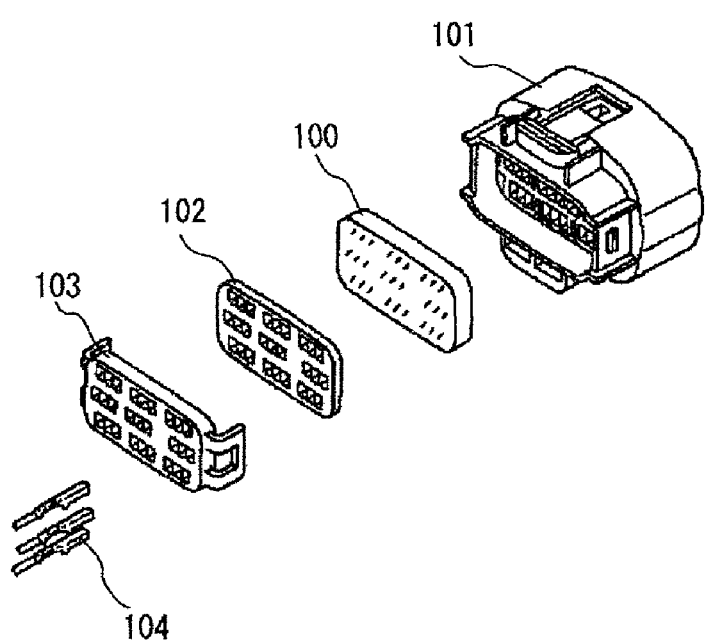
FIG. 9 is a view showing a prior art.

FIG. 8 shows a third embodiment.

Although the waterproof sheet 16 is wound around the water stop section 8 in the first embodiment, the water stop section 8 is coated with a heat shrinkable tube 40 having an adhesive 41 applied to an inner surface thereof instead of with the waterproof sheet. In other words, after being mounted on the water stop section 8, the heat shrinkable tube 40 is heated to be shrunk and is fixed to the outer circumferential surface of the water stop section 8 and those of the insulation coatings 12A, 12B at the opposite sides by the adhesive 41.

The other construction is similar to the first embodiment and functions and effects are also similar.

Although the ECU 1 is an engine fuel control unit in the first embodiment, the present invention is suitably used also in the case where a wire harness is connector-connected to an engine control unit, an ABS control unit, an airbag control unit, a running safety control unit, a vehicle radar control unit or a night-vision camera control unit.

The ECU is suitably used also in the case of controlling an apparatus for driving safety such as a light, a washer, a door lock, an anti-theft horn or a starter.

A wire harness formed by bundling wires each including a water stop section formed by the waterproofing method of the present invention can be applied in the case of connector connection in a water susceptible area not only in an automotive vehicle, but also in a motorcycle.

What is claimed is:

1. A water stop structure for a wire harness for preventing water penetration from the wire harness connected to an electronic control unit installed in an automotive vehicle or a motorcycle via a non-waterproof connector of the electronic control unit, characterized in that:
   terminals mounted on ends of wires constituting the wire harness are inserted and locked for connection in a wire harness connector to be mated with the non-waterproof connector of the electronic control unit, the wire harness connector having no means for sealing wires of the wire harness as the wires extend through the wire harness connector,
   each wire connected to the connector includes a water stop section at a leading end position of a bundled area very close to a wire harness connector connected position, and
   the water stop section is formed by swaging and crimping a crimping terminal to a core exposed part formed by exposing a core of each wire from an insulation coating part, filling a waterproofing agent into clearances between strands of the core exposed part between the crimping terminal and an insulation coating and coating the core exposed part with a waterproof member.

2. A water stop structure according to claim 1, wherein the crimping terminal swaged and crimped to the water stop section is an intermediate crimping terminal to be crimped and connected only to the core exposed part or a crimping terminal in which a barrel portion to be crimped and connected to the part of the insulation coating at one side of the core exposed part and an intermediate barrel portion to be crimped and connected to the core exposed part are connected via a base plate.

3. A water stop structure according to claim 1, wherein the waterproof member for coating the core exposed part filled with the waterproofing agent is:
   a waterproof cover which coats the core exposed part by being wound around the core exposed part, or
   a heat shrinkable tube which includes an inner layer of an adhesive and coats the core exposed part by being mounted thereon and heated to be shrunk.

4. A water stop structure according to claim 1, wherein the non-waterproof connector of the electronic control unit is installed in a water-free area not subject to water.

5. A water stop structure according to claim 1, wherein:
   the electronic control unit is one or more selected from an engine control unit, an engine fuel control unit, an ABS control unit, an airbag control unit, a running safety control unit, a vehicle radar control unit and a night-vision camera control unit, and
   devices connected to the electronic control unit via the wire harness are:
      one or more controllable devices selected from a light, a washer, a door lock, an anti-theft horn and a starter which are controlled by the electronic control unit,
      sensors selected from an $O_2$ sensor, a speed sensor, a knock sensor and a collision sensor, which are adapted to transmit information to the electronic control unit, and/or another electronic control unit, and
      one or more electrical components selected from a fuse, a relay, a connector and a ground member of an electrical connection box.

6. A method of forming a water stop section of a wire harness according to claim 1, characterized in that:
   a waterproofing agent is dropped to a core exposed part where a core is exposed form an insulation coating, and pressure air is introduced after the dropping of the waterproofing agent so that the dropped waterproofing agent penetrates into clearances between cores of the core exposed part and into clearances between cores inside parts of the insulation coating facing the core exposed part, and
   the core exposed part is then coated by having an adhesive waterproof sheet wound therearound.

* * * * *